(12) United States Patent
Californiaa (10) Patent No.: US 12,145,099 B2
(45) Date of Patent: Nov. 19, 2024

(54) MEMBRANE-BASED PROCESSING FOR AMBIENT WATER-GROUP SPECIES CAPTURED ON THE MOON AND IN SPACE

(71) Applicant: Eurica Californiaa, Laie, HI (US)

(72) Inventor: Eurica Californiaa, Laie, HI (US)

( * ) Notice: Subject to any disclaimer, the term of this patent is extended or adjusted under 35 U.S.C. 154(b) by 1005 days.

(21) Appl. No.: 16/773,950

(22) Filed: Jan. 27, 2020

(65) Prior Publication Data

US 2020/0156964 A1 May 21, 2020

Related U.S. Application Data (60) Provisional application No. 62/796,699, filed on Jan. 25, 2019.

(51) Int. Cl.
*B01D 53/26* (2006.01)
*B01D 61/42* (2006.01)
(Continued)

(52) U.S. Cl.
CPC ......... *B01D 53/263* (2013.01); *B01D 61/427* (2013.01); *B01D 61/56* (2013.01); *B01D 69/12* (2013.01); *B01D 71/10* (2013.01); *B01D 71/22* (2013.01); *B01D 71/66* (2013.01); *B01J 39/10* (2013.01); *C02F 1/4698* (2013.01);
(Continued)

(58) Field of Classification Search
CPC ......................... B01D 2257/80; B01D 53/263
See application file for complete search history.

(56) References Cited

U.S. PATENT DOCUMENTS 5,656,630 A * 8/1997 Curtze ................... A01N 37/38
514/237.5
7,060,169 B2 6/2006 Röhrl
(Continued)

FOREIGN PATENT DOCUMENTS

CA 3052716 A1 * 8/2018 .......... H01M 8/0258
WO WO-2017172824 A1 * 10/2017 ............. B01D 71/44

OTHER PUBLICATIONS

Doyle et al., High-Temperature Proton Conducting Membranes Based on Perfluorinated Ionomer Membrane-Ionic Liquid Composites, 147 J. Electrochem. Soc., 34, 34-37 (2000). (Year: 2000).*
(Continued)

*Primary Examiner* — Gabriel E Gitman
(74) *Attorney, Agent, or Firm* — Boies Schiller Flexner LLP (57) ABSTRACT

According to the method and device for a membrane-based processing of ambient water-group species, the species are captured in a space environment by an ionic liquid disposed on a presenting face of a semipermeable membrane. To seamlessly process the captured species for in-situ resource utilization without need of moving parts, they are urged to pass through the membrane by a predetermined electric potential difference applied between opposite sides of the membrane via electrode contacts; an initial storage envelope is provided by an impermeable membrane attached to a back face of the semipermeable membrane. The device can be stowed in a manner of rolled plastic and deployed by unrolling. The device can also be configured as a scientific instrument to monitor a flux of ambient water-group species impinging in the space environment using electrical measurements.

30 Claims, 7 Drawing Sheets (51) Int. Cl.

| | | |
|---|---|---|
| *B01D 61/56* | (2006.01) | |
| *B01D 69/12* | (2006.01) | |
| *B01D 71/10* | (2006.01) | |
| *B01D 71/22* | (2006.01) | |
| *B01D 71/66* | (2006.01) | |
| *B01J 39/10* | (2006.01) | |
| *C02F 1/469* | (2023.01) | |
| *F24F 3/14* | (2006.01) | |
| *C25B 1/04* | (2021.01) | |

(52) U.S. Cl.
CPC .. *B01D 2252/30* (2013.01); *B01D 2311/2603* (2013.01); *B01D 2311/2623* (2013.01); *B01D 2325/42* (2013.01); *C25B 1/04* (2013.01); *F24F 3/1417* (2013.01); *F24F 2003/1435* (2013.01)

(56) References Cited

U.S. PATENT DOCUMENTS

| | | |
|---|---|---|
| 7,922,931 B1 | 4/2011 | Cordaro et al. |
| 9,061,235 B1 | 6/2015 | Califormiaa |
| 9,232,299 B2 | 1/2016 | Lin |
| 9,250,348 B2 | 2/2016 | Candy |
| 9,416,026 B2 | 8/2016 | Califormiaa |
| 10,191,308 B2 | 1/2019 | Han et al. |
| 10,290,890 B2 | 5/2019 | Yan et al. |
| 2004/0076865 A1* | 4/2004 | Breault ............... C08J 5/2275 521/27 |
| 2009/0159456 A1 | 6/2009 | Littau |
| 2009/0233155 A1 | 9/2009 | Littau |
| 2011/0209997 A1* | 9/2011 | Rohrl ................. C07C 211/62 204/431 |
| 2012/0119410 A1* | 5/2012 | Yan ................... B01D 67/0006 264/216 |
| 2018/0257027 A1 | 9/2018 | Desai et al. |
| 2019/0013537 A1* | 1/2019 | Song .................. H01M 8/1018 |
| 2019/0036143 A1 | 1/2019 | Yan et al. |
| 2019/0161870 A1* | 5/2019 | Wang .................. C25B 15/02 |
| 2020/0206682 A1* | 7/2020 | Desai .................. B01D 53/268 |

OTHER PUBLICATIONS van de Ven et al., Ionic liquid doped polybenzimidazole membranes for high temperature Proton Exchange Membrane fuel cell applications, 222 J. Power Sources, 202, 202-209 (2013). (Year: 2013).*

ELAT, fuelcellstore.com, available at https://shorturl.at/cdgk0, last visited Jul. 14, 2023. (Year: 2023).*

Nancarrow et al. (2017). Ionic liquids in space technology-current and future trends. ChemBioEng Reviews, 4(2), 106-119. (Year: 2017).*

Ito (2000). Dehumidification of air by a hygroscopic liquid membrane supported on surface of a hydrophobic microporous membrane. Journal of Membrane Science, 175(1), 35-42. (Year: 2000).*

Hall, "Phases of Matter," NASA Glenn Research Center, https://www.grc.nasa.gov/www/k-12/airplane/state.html (accessed Nov. 15, 2021).

Borra et al., "Deposition of metal films on an ionic liquid as a basis for a lunar telescope," Nature, vol. 447, No. 7147, 2007, pp. 979-981.

Califormiaa, "Influence of the lunar ambience on dynamic surface hydration on sunlit regions of the Moon," Advances in Space Research, vol. 55, No. 6, 2015, pp. 1705-1709.

de Souza et al., "Electrochemical hydrogen production from water electrolysis using ionic liquid as electrolytes: Towards the best device," Journal of Power Sources, vol. 164, No. 2, 2007, pp. 792-798.

Erlandsson et al., "Electrolysis-reducing electrodes for electrokinetic devices," Electrophoresis, vol. 32, No. 6-7, 2011, pp. 784-790.

Islam et al., "Water electrolysis: An excellent approach for the removal of water from ionic liquids," Chemical Communications, Nov. 14, No. 42, 2008, pp. 5330-5332.

Janz et al., "Physical properties data compilations relevant to energy storage. I. Molten salts: Eutectic data," National Standard Reference Data Series, National Bureau of Standards (U.S.), vol. 61, Part 1, 1978.

Kagimoto et al., "Ionic liquids derived from natural sources," In: Plechkova et al., eds., Ionic Liquids UnCOILed: Critical Expert Overviews, Hoboken, NJ: John Wiley & Sons, 2013, Ch. 7, pp. 231-250.

Mirabel et al., "A theory for the deliquescence of small particles," Journal of Chemical Physics, vol. 113, No. 18, 2000, pp. 8200-8205.

Ramdin et al., "High pressure electrochemical reduction of CO2 to formic acid/formate: A comparison between bipolar membranes and cation exchange membranes," Industrial & Engineering Chemistry Research, vol. 58, No. 5, 2019, pp. 1834-1847.

Silva et al., "Solution-cast Nafion® ionomer membranes: Preparation and characterization," Electrochimica Acta, vol. 49, No. 19, 2004, pp. 3211-3219.

Smith et al., "Deep eutectic solvents (DESs) and their applications," Chemical Reviews, vol. 114, No. 21, 2014, pp. 11060-11082.

Thomson et al., "A flourinated ionic liquid as a high-performance fuel cell electrolyte," ECS Transactions, vol. 13, No. 28, 2008, pp. 21-29.

Thomson et al., "Protic ionic liquids as electrolytes for high efficiency water electrolysis," 214th Meeting of the Electrochemical Society, Honolulu, HI, Oct. 2008, ECS Meeting Abstracts, Abstract MA2008-02 67.

Vila et al., "Great increase of the electrical conductivity of ionic liquids in aqueous solutions," Fluid Phase Equilibria, vol. 247, No. 1-2, 2006, pp. 32-39.

Wang et al., "Poly(aryl piperidinium) membranes and ionomers for hydroxide exchange membrane fuel cells," Nature Energy, vol. 4, 2019, pp. 392-398.

Widegren et al., "Relative volatilities of ionic liquids by vacuum distillation of mixtures," Journal of Chemical Physics B, vol. 111, No. 30, 2007, pp. 8959-8964.

Yasuda et al., "Protic ionic liquids: Fuel cell applications," MRS Bulletin, vol. 38, No. 7, 2013, pp. 560-566.

Zhang et al., "Physical properties of ionic liquids: Database and evaluation," Journal of Physical and Chemical Reference Data, vol. 35, No. 4, 2006, pp. 1475-1517.

Mahoney, "In-situ resource utilization: Using space-based resources for human missions in deep space," https://www.hasa.gov/isru (accessed Jan. 20, 2020).

Watanabe et al., "Application of ionic liquids to energy storage and conversion materials and devices," Chemical Reviews, vol. 117, No. 10, 2017, pp. 7190-7239.

Almehisni et al., "Heat transfer influence of solar panel on spacecraft," 2018 Advances in Science and Engineering Technology International Conferences (ASET), Dubai, Sharjah, Abu Dhabi, United Arab Emirates, 2018, pp. 1-6.

Foster, Small Satellite Thermal Guide, Air Force Research Laboratory/ Space Vehicles Directorate (Kirtland Air Force Base, New Mexico), Accession No. AD1170386, 2022.

National Aeronautics and Space Administration, Spacecraft Thermal Control, NASA-SP-8105 (National Technical Information Service, Springfield, VA), May 1, 1973.

Harrington, "Proton-exchange-membrane fuel cell tested at Glenn," NASA News, Oct. 4, 2005, https://www.nasa.gov/centers/glenn/news/pressrel/2005/05-040_PEM_Cell.html (accessed Mar. 30, 2023).

Wikipedia, "Eutectic system," accessed Apr. 5, 2023.
Wikipedia, "Ionic liquid," accessed Apr. 5, 2023.
Wikipedia, "Salt (chemistry)," accessed Apr. 5, 2023.
Wikipedia, "2,3,3,3-Tetrafluoropropene," accessed Feb. 5, 2022.
Öpik, "The density of the lunar atmosphere," Irish Astronomical Journal, vol. 4, No. 6, 1957, pp. 186-189.

* cited by examiner

MEMBRANE-BASED PROCESSING FOR AMBIENT WATER-GROUP SPECIES CAPTURED ON THE MOON AND IN SPACE

PROPERTY RIGHTS STATEMENT TO NASA

The invention was not made under nor is there any relationship of the invention to the performance of any work under any contract of the National Aeronautics and Space Administration (NASA).

BACKGROUND OF THE INVENTION

1. Field of Invention

The invention relates to methods and devices for processing ambient water-group species captured within a surface-bound exosphere or while traveling in space. The Moon and planet Mercury are exemplary of celestial bodies having surface-bound exospheres.

2. Incorporated Teachings

This application claims the benefit of U.S. provisional application Ser. No. 62/796,699, filed on Jan. 25, 2019, for a hydrogen electrolyzer module (HEM) to process and store hydrogen from ambient water-group species captured on the non-polar lunar surface, which is incorporated herein in its entirety by way of reference.

The following patent teachings are incorporated herein in their entirety by way of reference: U.S. application Ser. No. 12/850,032, filed on Aug. 4, 2010, for a low-melting point heat transfer fluid, now U.S. Pat. No. 7,922,931 (Cordaro et al.); U.S. application Ser. No. 12/848,219, filed on Aug. 1, 2010, for a method of collecting water on the Moon, now U.S. Pat. No. 9,061,235 (Californiaa); U.S. application Ser. No. 14/746,710, filed on Jun. 22, 2015, for a method of collecting water on a spaceship traveling in space, now U.S. Pat. No. 9,416,026 (Californiaa); and, U.S. application Ser. No. 16/146,887, filed on Sep. 28, 2018, for poly (aryl piperidinium) polymers for use as hydroxide exchange membranes and ionomers, now U.S. Pat. No. 10,290,890 (Yan et al.).

The following non-patent literature references are incorporated herein in their entirety by way of reference: Borra et al., "Deposition of metal films on an ionic liquid as a basis for a lunar telescope," Nature, Vol. 447, No. 7147, 2007, pp. 979-981; Californiaa, "Influence of the lunar ambience on dynamic surface hydration on sunlit regions of the Moon," Advances in Space Research, Vol. 55, No. 6, 2015, pp. 1705-1709; de Souza et al., "Electrochemical hydrogen production from water electrolysis using ionic liquid as electrolytes: Towards the best device," Journal of Power Sources, Vol. 164, No. 2, 2007, pp. 792-798; Erlandsson et al., "Electrolysis-reducing electrodes for electrokinetic devices," Electrophoresis, Vol. 32, No. 6-7, 2011, pp. 784-790; Islam et al., "Water electrolysis: An excellent approach for the removal of water from ionic liquids," Chemical Communications, November 14, No. 42, 2008, pp. 5330-5332; Janz et al., "Physical properties data compilations relevant to energy storage. I. Molten salts: Eutectic data," National Standard Reference Data Series, National Bureau of Standards (U.S.), Vol. 61, Part 1, 1978; Kagimoto et al., "Ionic liquids derived from natural sources," In: Plechkova et al., eds., Ionic Liquids UnCOILed: Critical Expert Overviews, Hoboken, NJ: John Wiley & Sons, 2013, Ch. 7, pp. 231-250; Mirabel et al., "A theory for the deliquescence of small particles," Journal of Chemical Physics, Vol. 113, No. 18, 2000, pp. 8200-8205; Ramdin et al., "High pressure electrochemical reduction of $CO_2$ to formic acid/formate: A comparison between bipolar membranes and cation exchange membranes," Industrial & Engineering Chemistry Research, Vol. 58, No. 5, 2019, pp. 1834-1847; Silva et al., "Solution-cast Nafion® ionomer membranes: Preparation and characterization," Electrochimica Acta, Vol. 49, No. 19, 2004, pp. 3211-3219; Smith et al., "Deep eutectic solvents (DESs) and their applications," Chemical Reviews, Vol. 114, No. 21, 2014, pp. 11060-11082; Thomson et al., "A flourinated ionic liquid as a high-performance fuel cell electrolyte," ECS Transactions, Vol. 13, No. 28, 2008, pp. 21-29; Thomson et al., "Protic ionic liquids as electrolytes for high efficiency water electrolysis," 214th Meeting of the Electrochemical Society, Honolulu, HI, October 2008, ECS Meeting Abstracts, Abstract MA2008-02 67; Vila et al., "Great increase of the electrical conductivity of ionic liquids in aqueous solutions," Fluid Phase Equilibria, Vol. 247, No. 1-2, 2006, pp. 32-39; Wang et al., "Poly (aryl piperidinium) membranes and ionomers for hydroxide exchange membrane fuel cells," Nature Energy, Vol. 4, 2019, pp. 392-398; Widegren et al., "Relative volatilities of ionic liquids by vacuum distillation of mixtures," Journal of Chemical Physics B, Vol. 111, No. 30, 2007, pp. 8959-8964; Yasuda et al., "Protic ionic liquids: Fuel cell applications," MRS Bulletin, Vol. 38, No. 7, 2013, pp. 560-566; and, Zhang et al., "Physical properties of ionic liquids: Database and evaluation," Journal of Physical and Chemical Reference Data, Vol. 35, No. 4, 2006, pp. 1475-1517.

3. Prior Art

According to NASA, "The farther humans go into deep space, the more important it will be to generate their own products with local materials, a practice called in-situ resource utilization (ISRU) . . . . As human space exploration evolves toward longer journeys farther from our home planet, ISRU will become increasingly important. . . . Future astronauts will require the ability to collect space-based resources [e.g., water] . . . " See Mahoney, "In-situ resource utilization: Using space-based resources for human missions in deep space." https://www.nasa.gov/isru (accessed Jan. 20, 2020).

Uses for water and its atomic and molecular components are well known. A variety of unique challenges are posed by the need to get water on the Moon and elsewhere in space.

For example, NASA has announced plans to get water from lunar cold traps located in permanently shadowed regions (PSRs). However, this poses the challenge of requiring operation in the extremely cold environment of the PSRs.

The prior art concept of extracting water trapped within the sunlit lunar soil also poses challenges as well. For example, analysis of lunar return samples found the soil to be essentially anhydrous, in which case a vast volume of soil would need to be processed to yield even so much as a single glass of water.

In contrast, the method of collecting water on the Moon taught in U.S. Pat. No. 9,061,235 relies on capturing ambient water-group species impinging on the lunar surface; and, the method of collecting water on a spaceship traveling in space taught in U.S. Pat. No. 9,416,026 relies on capturing ambient water-group species impinging on exterior surfaces of the spaceship. The methods of capturing taught in '235 and '026 employ chemically treated surfaces to make ambient water-group species stick to them like flies on fly paper. These two patented technologies are at the foundation of the present teaching.

4. Statement of the Necessity

When capturing ambient water-group species on the Moon and in space according to the methods taught in '235 and '026, it is necessary to process the captured water-group species in order to recover them from the "fly paper" that captured them.

What is needed is a membrane-based processing for ambient water-group species captured on the Moon and in space.

BRIEF SUMMARY OF THE INVENTION

The invention satisfies the above-stated needs.

It is an object of the invention to enable an in-situ resource utilization (ISRU) of water-group species.

It is further an object to provide a membrane-based processing for ambient water-group species captured on the Moon and in space.

It is further an object to provide a method and device for seamlessly processing ambient water-group species captured on the Moon and in space.

It is further an object to provide a device to accomplish said seamless processing under electrical power and without need for mechanical moving parts.

It is further an object to provide a device for said processing which is lightweight and compactly stowable in rolls in a manner of rolled plastic sheeting.

It is further an object to provide a device for measuring a flux of ambient water-group species impinging in a space environment.

The invention satisfies these and other objects.

Referring to FIGS. 1, 2, 3, and 4, which show a preferred embodiment configured for practice on a surface of the Moon 88, the invention is a device 77 for a membrane-based processing of ambient water-group species 99 captured within a surface-bound exosphere or while traveling in space, comprising: a semipermeable membrane 29; an ionic liquid 27 disposed on a presenting face 20 of the semipermeable membrane 29 to capture ambient water-group species 99 within the surface-bound exosphere or while traveling in said space, the presenting face 20 being in gaseous communication with the surface-bound exosphere or said space; a back face of the semipermeable membrane 29 being bounded by an internal void 22 forming a reservoir for storing the captured water-group species 99; and, topside and underside electrode contacts 30, 31 disposed on opposite faces of the semipermeable membrane 29, whereby application of a predetermined electric potential difference across the semipermeable membrane 29 via the electrode contacts 30, 31 urges at least some of the water-group species 99 captured on the presenting face 20 to pass through the semipermeable membrane 29 and into the internal void 22.

According to a non-limiting theory of the invention, the ionic liquid 27 plays a plurality of roles, including but not limited to: remaining liquid at lunar surface temperatures, not evaporating into the vacuum of space, capturing water-group species by virtue of its hygroscopic properties, and providing an electrically conductive medium in which water-group species are mobile.

According to a non-limiting theory of the invention, and depending on how the device 77 is configured in view of the detailed description to follow, the electric potential difference urges captured water-group species 99 to pass through the semipermeable membrane 29 on the basis of fuel cell principles or electroosmotic flow.

Advantageously, the device 77 seamlessly processes the captured water-group species 99 out of the ionic liquid 27 and into the internal void 22 under electrical power and without need for mechanical moving parts.

Advantageously, the internal void 22 provides an initial storage reservoir for the water-group species 99 captured by the device 77, which may then be utilized directly or undergo further compression or condensation according to the art.

Advantageously, the device 77 functions like "fly paper" to capture ambient water-group species 99 regardless of whether the electric potential difference is being applied to pass the captured species into the internal void 22. Accordingly, the electric potential difference can be applied at convenience to process the captured water-group species 99 out of the ionic liquid 27 and into the internal void 22. For example, the electric potential difference can be provided at "harvest time" by solar power or a roving power supply.

Advantageously, in addition to enabling an ISRU of water-group species, the inventive device 77 can also be configured to serve as a scientific instrument to measure an incident flux of the water-group species 99 impinging upon the presenting face 20, by measuring changes in an electrical resistivity of the ionic liquid 27 or by measuring an amount of electrical current expended in applying the electric potential difference over time to urge the captured water-group species 99 to pass through the semipermeable membrane 29.

Figure 1:
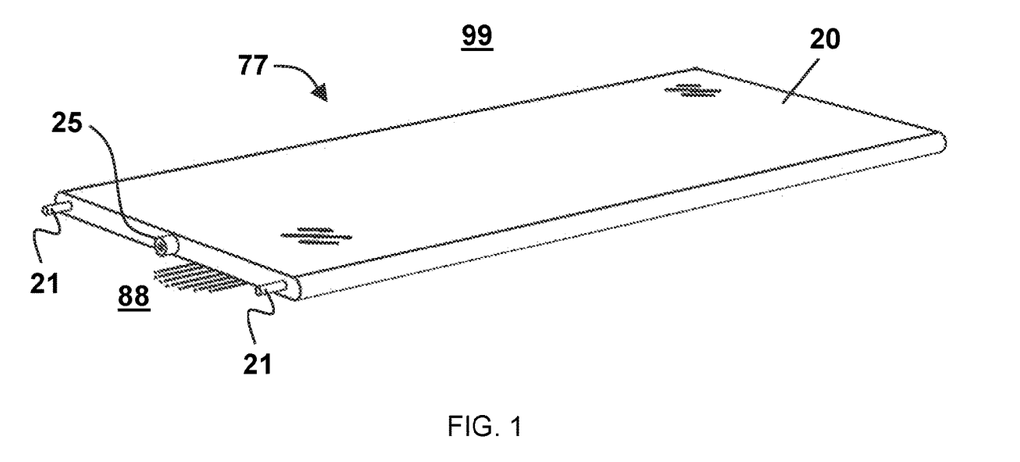
FIG. 1 is a side perspective view of a preferred embodiment of the inventive device deployed on a surface of the Moon and is most descriptive of the invention.
Figure 5:
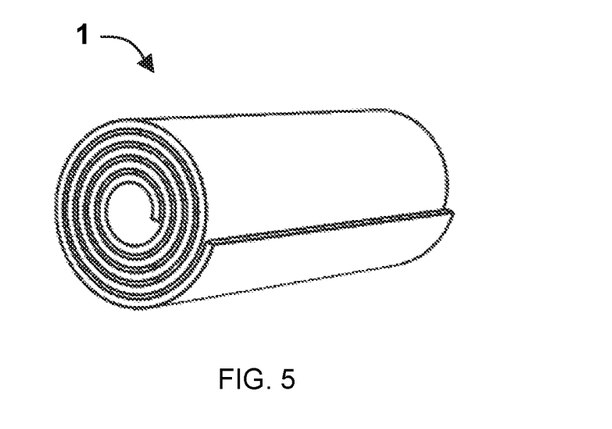
FIG. 5 is a side perspective view of the device rolled up for stowage.

As shown in FIG. 5 in view of FIG. 1, the inventive device 77 can be stowed in rolled form in the manner of rolled plastic sheeting, which is then unrolled for deployment on the surface of the Moon 88. Advantageously, the rolled form of the device 77 occupies little space compared to a surface area of the presenting face 20 provided for capturing the water-group species 99 when the device 77 is unrolled; and, multiple devices 77 can be stacked together in rolled form in a hexagonal packing structure for compact payload stowage during delivery to the Moon.

Figure 2:
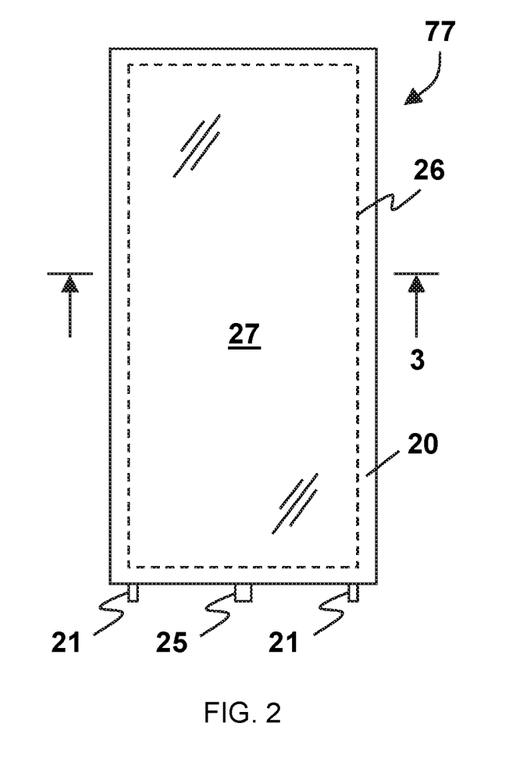
FIG. 2 is a top orthogonal view of the device.
Figure 3:
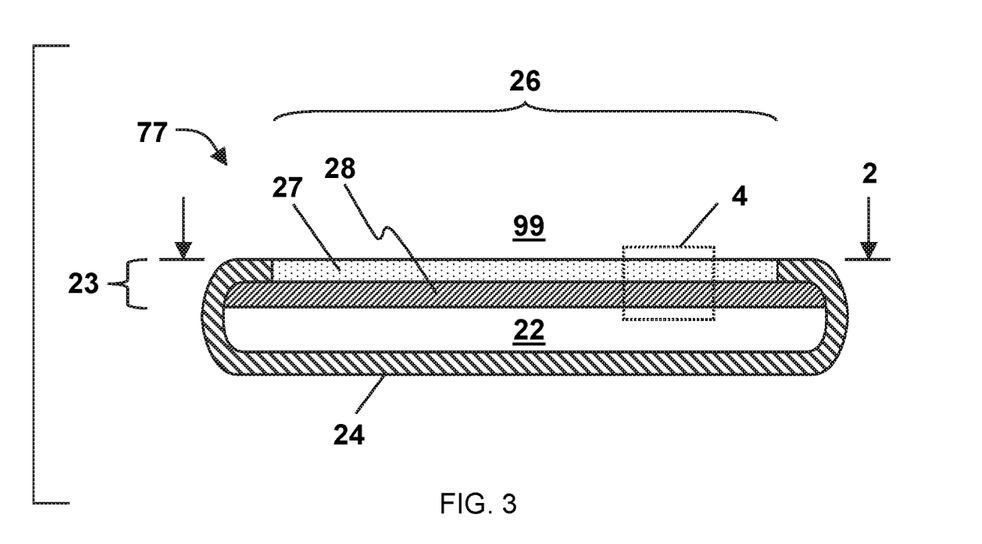
FIG. 3 is side cross-sectional view of the device taken about a line 3 in FIG. 2.
Figure 4:
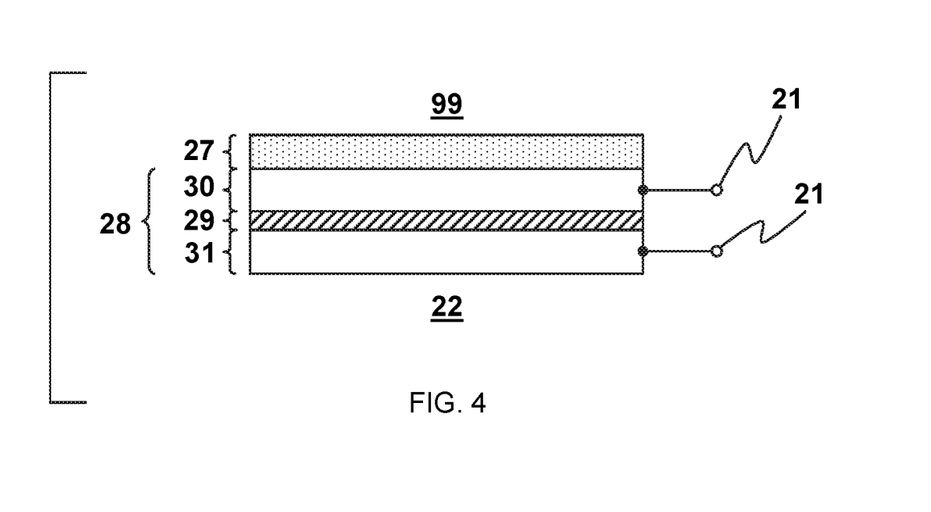
FIG. 4 is a close-up view of a section of the device shown in FIG. 3.

To give an additional analogy, as shown in FIG. 1 in view of FIGS. 2, 3, and 4, the device 77 resembles an inflatable pool mattress with sticky fly paper on top, where the presenting face 20 covered with the ionic liquid 27 forms the fly paper. When the predetermined electric potential difference is applied to the electrode contacts 30, 31 via electrical contacts 21 disposed on an edge of the device 77, water-group species 99 captured on the presenting face 20 are passed through the semipermeable membrane 29 and into the internal void 22 so as to inflate the mattress. Referring to FIG. 1, the device 77 can be provided with a connection valve 25 for withdrawing the collected water-group species 99 contained within the internal void 22.

Advantageously, the uninflated mattress can be rolled up for compact stowage and then deployed by unrolling it with the fly paper facing upward. To put matters in perspective using exemplary dimensions, where the device 77 is 2 mm thick in its uninflated state, the device 77 can roll out to a length of 100 m (109 yards), starting with a roll which is 51 cm (20 inches) in diameter, including a 5 cm (2 inch) core. Advantageously, the inventive device 77 enables water-group species 99 to be captured over a large harvest area, while taking up a relatively small payload volume during transit.

Advantageously, rather than having to transport water from place to place, the device 77 can be deployed by individual spacecraft to harvest water-group species 99 at places where needed. Advantageously, the device 77 can be rolled back up and taken elsewhere or it can be left in place to continue capturing water-group species 99 for returning missions.

These and other objects and advantages of the invention will be appreciated in view of the detailed description to follow.

DETAILED DESCRIPTION OF THE INVENTION

It is an object of the invention to provide a membrane-based processing for ambient water-group species captured on the Moon and in space, whereby water-group species captured on a thin film of an ionic liquid covering a presenting face of the membrane are seamlessly passed into an initial storage envelope on the other side without moving parts using an electric potential difference applied across the membrane.

1. Technical Background and Definitions

In this disclosure, space, also known as outer space, means a region between celestial bodies, including any surface-bound exosphere but not including any homosphere.

Water can exist in any of four states of matter: solid, liquid, vapor, or plasma. Although water generally means $H_2O$ or a molecule or chemical structure based on $H_2O$, it also includes any species of water substance in its relevance to water, including members of the ionization pairs of water, the photodissociation or radical pairs of water, and the ion-electron or plasma pairs of water. Exemplary ionization pairs of water include ($H^+$, $OH^-$) and ($H_3O^+$, $OH^-$). Exemplary photodissociation or radical pairs of water include (H, OH). Exemplary ion-electron or plasma pairs of water include ($H_2O^+$, $e^-$), ($H_3O^+$, $e^-$), and ($OH^+$, $e^-$). Also counted as species of water substance are atomic or molecular species derived or created from water substance, for example, atomic or molecular hydrogen or oxygen derived from water. In this disclosure, the term water-group species means any species of water or water substance.

In this disclosure, the term ambient in reference to ambient water-group species means to emphasize vapor phase or plasma phase species, but it also includes particulates of solid or liquid water having a particle mass of not more than one-tenth of one gram.

In this disclosure, an ionic liquid is a salt, salt mixture, or saltwater solution in liquid form. Due to their ionic character, ionic liquids collect water from their surroundings. Of particular interest in the practice of the invention are ionic liquids that remain liquid and have negligible vapor pressure at lunar surface temperatures. Academically speaking, the general consensus has been that ionic liquids are liquid below 100 Celsius. But in this disclosure the distinguishing temperature is taken for practical convenience as maximum lunar surface temperature, or substantially 120 Celsius. Three categories of ionic liquids are recognized in this disclosure: 1) pure salts, 2) salt mixtures, and 3) aqueous salt solutions.

In the first category are pure salts which are liquid below 120 Celsius. Of those studied to date, ionic liquids of this category usually have an organic component and usually the cation is organic and the anion is inorganic; in a zwitterion-type ionic liquid, both the cation and anion are located on the same organic molecule. As Zhang et al. explain (p. 1475, column 1), ionic liquids are often studied as "green" (environment-friendly) solvents thanks to having such advantageous properties as "negligible vapor pressure, large liquidus range, high thermal stability, high ionic conductivity, large electrochemical window, and ability to solvate compounds of widely varying polarity." See Zhang et al., "Physical properties of ionic liquids: Database and evaluation," Journal of Physical and Chemical Reference Data, Vol. 35, No. 4, 2006, pp. 1475-1517.

In the second category are mixtures including at least one salt in predetermined proportions having a eutectic point (i.e., which are liquid) below 120 Celsius. An exemplary list of such mixtures, their predetermined proportions, and eutectic point temperatures is provided in Table 1 of Janz et al. See Janz et al., "Physical properties data compilations relevant to energy storage. I. Molten salts: Eutectic data," National Standard Reference Data Series, National Bureau of Standards (U.S.), Vol. 61, Part 1, 1978. In this disclosure, also included in this category are the so called deep eutectic solvents. See Smith et al., "Deep eutectic solvents (DESs) and their applications," Chemical Reviews, Vol. 114, No. 21, 2014, pp. 11060-11082.

In the third category are hygroscopic salts which form a eutectic mixture with water (i.e., which deliquesce) at temperatures below 120 Celsius. However, where the eutectic mixture consists of water and a single inorganic salt, only small particles in the nanometer or micrometer range will likely have a water vapor pressure low enough to preclude dehydration in a space environment. See Mirabel et al., "A theory for the deliquescence of small particles," Journal of Chemical Physics, Vol. 113, No. 18, 2000, pp. 8200-8205.

Ionic liquids may be further categorized as being protic or aprotic. Protic ionic liquids are capable of donating a labile proton and aprotic ionic liquids are not.

A property of ionic liquids is they have extremely low vapor pressure (~$10^{-10}$ Pa) at temperatures near or below room temperature. See Widegren et al., "Relative volatilities of ionic liquids by vacuum distillation of mixtures," Journal of Chemical Physics B, Vol. 111, No. 30, 2007, pp. 8959-8964.

Borra et al. have suggested exploiting this property to make a liquid mirror telescope on the surface of the Moon by coating an ionic liquid with a layer of reflective silver. They considered a commercially available ionic liquid and state (p. 979, column 1): "The underlying ionic liquid does not evaporate in a vacuum and remains liquid down to a temperature of 175 K [−98 Celsius]." See Borra et al., "Deposition of metal films on an ionic liquid as a basis for a lunar telescope," Nature, Vol. 447, No. 7147, 2007, pp. 979-981.

In U.S. Pat. No. 7,922,931, Cordaro et al. teach (claim 1) "A heat transfer fluid having a liquidus temperature of about 70° C., comprising a mixture of any combination of $LiNO_3$, $NaNO_3$, KNOB, $NaNO_2$ and $KNO_2$ salts" having specified proportions. They teach (column 5, lines 64-65) "molten salt has virtually no inherent vapor pressure".

Water electrolysis has been demonstrated in ionic liquids. See de Souza et al., "Electrochemical hydrogen production from water electrolysis using ionic liquid as electrolytes: Towards the best device," Journal of Power Sources, Vol. 164, No. 2, 2007, pp. 792-798. Electrolysis of trace water content has been demonstrated in ionic liquids. See Islam et al., "Water electrolysis: An excellent approach for the removal of water from ionic liquids," Chemical Communications, November 14, No. 42, 2008, pp. 5330-5332. Advantages have been disclosed for water electrolysis in protic ionic liquids. See Thomson et al., "Protic ionic liquids as electrolytes for high efficiency water electrolysis," 214th Meeting of the Electrochemical Society, Honolulu, HI, October, 2008, ECS Meeting Abstracts, Abstract MA2008-02 67.

Kagimoto et al. have disclosed ionic liquids which are halogen-free and derived from natural sources, which suggests an environment-friendly quality. See Kagimoto et al., "Ionic liquids derived from natural sources," In: Plechkova et al., eds., Ionic Liquids UnCOILed: Critical Expert Overviews, Hoboken, NJ: John Wiley & Sons, 2013, Ch. 7, pp. 231-250.

One skilled in the art of electrochemistry will appreciate that fuel cells principles and electrolyzer principles regard reciprocal operations in an electrochemical cell. Accordingly, reference made in this disclosure to the art of fuel cells includes the art of electrolyzers, and vice versa. The electric potential difference of an electrochemical cell is determined as a combination of a standard electric potential difference, which is a minimum thermodynamic requirement for an electrochemical reaction to take place, plus voltage losses in the form of an overpotential. The overpotential can have many sources and reflects a reaction's inefficiency, resulting in energy lost as heat. Although the standard electric potential difference required for an electrochemical reaction can be determined from data on minimum thermodynamic requirements, determination of an actual amount of electric potential difference required must be arrived at experimentally to account for overpotential.

2. Preferred Embodiments

FIG. 1 shows a side perspective view of a preferred embodiment of the inventive device 77 deployed on the surface of the Moon 88 to capture ambient water-group species 99 on the presenting face 20 within the surface-bound lunar exosphere. Referring to FIGS. 1, 2, 3, and 4, when externally powered by an electrical power supply via the electrical contacts 21, the device 77 passes the captured water-group species 99 into the internal void 22 and inflates like an inflatable pool mattress. The internal void 22 is formed by top and bottom layers 23, 24 which are sealed together to form a storage envelope for the captured water-group species 99. The bottom layer 24 preferably comprises a membrane which is impermeable to any chemical contents to be retained within the internal void 22. An exemplary impermeable membrane comprises an impermeable polymeric, metallic, or metalized film. The connection valve 25 provides external communication with the internal void 22. The uninflated device 77 can be rolled up like a roll of plastic sheeting for compact stowage, as shown in FIG. 5.

FIG. 3 shows a side cross-sectional view of the device 77. Referring to FIGS. 1, 2, 3, and 4, an active area 26 of the presenting face 20 is disposed with the ionic liquid 27 for capturing ambient water-group species 99 within the surface-bound exosphere. The ionic liquid 27 covers a semipermeable layer 28 underneath. As shown in FIG. 4, the semipermeable layer 28 comprises the semipermeable membrane 29 backed on opposite faces by the topside and underside electrode contacts 30, 31. In this disclosure, the term electrode contact includes not only the plain and ordinary meaning of an electrode, but can also include an electrode loaded with catalyst, an electrode forming a diffusion layer for electrolytes or gases, and an electrode containing an ion conducting medium, for example, a proton conducting medium (PCM); this extended meaning will be appreciated by one skilled in the art of fuel cells. The electrode contacts 30, 31 are in electrical communication with respective electrical contacts 21. In operation, an electric potential difference is applied to the electrode contacts 30, 31 via the electrical contacts 21 to urge at least some of the captured water-group species 99 to pass through the semipermeable membrane 29 and into the storage envelope formed by the internal void 22.

Referring to FIG. 4 in view of FIGS. 1, 2, and 3, according to a preferred embodiment, the invention is a method of membrane-based processing for ambient water-group species 99 captured within a surface-bound exosphere or while traveling in space, comprising: (a) on the presenting face 20 of the semipermeable membrane 29 disposed with the ionic liquid 27, capturing ambient water-group species 99 within the surface-bound exosphere or while traveling in space, the presenting face 20 being in gaseous communication with the surface-bound exosphere or said space; and, (b) applying a predetermined electric potential difference between opposite faces of the semipermeable membrane 29 to urge at least some of the water-group species 99 captured on the presenting face 20 to pass through the semipermeable membrane 29.

The preferred embodiments will be further appreciated in view of the examples, accessories, and additional disclosure to follow.

As will be appreciated by one skilled in the art of electrochemistry, the examples employ whole number stoichiometry to simplify the illustration of exemplary electrochemical reactions taking place.

Example 1

Figure 6:
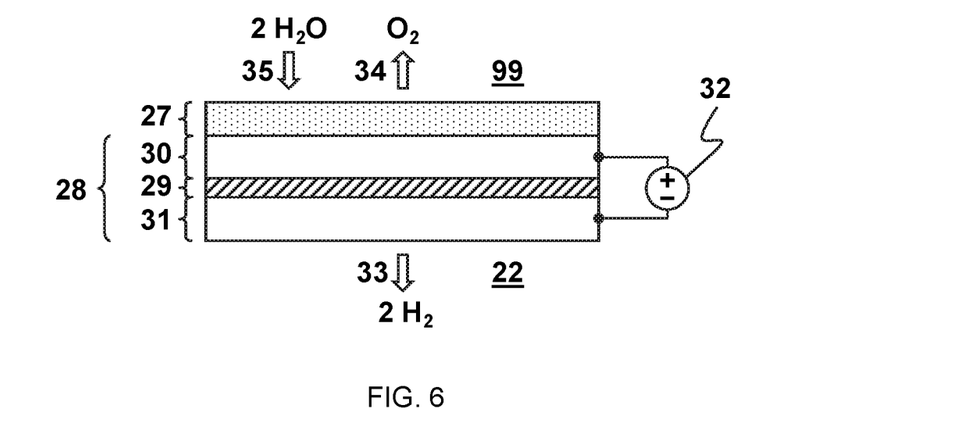
FIG. 6 shows the section of the device shown in FIG. 4, wherein the semipermeable membrane 29 comprises a proton exchange membrane.

Referring to FIG. 6 in view of FIGS. 1, 2, 3, and 4, according to the device 77 of this example, the semipermeable membrane 29 comprises a proton exchange membrane; the proton exchange membrane comprises a perfluorinated ion-exchange membrane; and, the proton exchange membrane has disposed therein a proton conducting medium comprising a protic ionic liquid. According to a non-limiting theory of the invention, the device 77 of this example is configured to urge captured water-group species 99 to pass through the semipermeable membrane 29 on the basis of the well-known principles of a proton exchange membrane electrolyzer. As shown in FIG. 6, the device 77 of this example passes a molecular hydrogen component of the captured water-group species 99 to the internal void 22, while neglecting an oxygen component captured.

Referring to FIG. 3 in view of FIGS. 1, 2, 4, and 6, according to the device 77 of this example, the bottom layer 24 comprises a 0.005 inch (127 micron) thick polyoxymethylene (POM) film, also known as acetal, polyacetal, or polyformaldehyde. POM is advantageous because of its low permeability to hydrogen and because its maximum use temperature is not less than maximum lunar temperatures. Because POM is not inherently resistant to ultraviolet (UV) radiation, exposed surfaces of the POM film are treated with a UV-blocking agent. The bottom layer 24 is also treated with a hydrophobic coating to reduce sticking between the ionic liquid 27 and an underside of the bottom layer 24 when unrolling the device 77.

According to the device 77 of this example, the semipermeable layer 28 comprises a commercially available electrolyzer catalyst coated membrane (CCM) (FuelCellsEtc, College Station, TX) configured as a proton exchange membrane (PEM) electrolyzer, in which a 0.005 inch (127 micron) thick perfluorinated proton exchange membrane (Nafion® 115; Chemours, Wilmington, DE) is sandwiched between an anode comprising a carbon cloth-based diffusion layer loaded with 3 mg $cm^{-2}$ iridium ruthenium oxide catalyst (InRuOx) and a cathode comprising a carbon cloth-based diffusion layer loaded with 3 mg $cm^2$ platinum black catalyst (PtB). According to the device 77 of this example, the PEM serves as the semipermeable membrane 29, the anode serves as the topside electrode contact 30, and the cathode serves as the underside electrode contact 31.

According to the device 77 of this example, a proton conducting medium (PCM) comprising a protic ionic liquid (PIL) is employed as the PCM of the semipermeable membrane 29. The PIL of this example is 2-fluoropyridinium triflate (2-FPTf), which can be made by mixing equimolar amounts of 2-fluoropyridine and triflic acid, also known as trifluoromethanesulfonic acid. See Thomson et al., "A flourinated ionic liquid as a high-performance fuel cell electrolyte," ECS Transactions, Vol. 13, No. 28, 2008, pp. 21-29; Thomson et al., "Protic ionic liquids as electrolytes for high efficiency water electrolysis," 214th Meeting of the Electrochemical Society, Honolulu, HI, October 2008, ECS Meeting Abstracts, Abstract MA2008-02 67.

According to the device 77 of this example, the CCM is soaked in the PIL to provide the PCM for the PEM and an excess of the PIL is squeegeed off to leave a thin layer of the PIL on top of the anode and which thin layer serves as the ionic liquid 27 on top of the semipermeable layer 28 to capture ambient water-group species 99. The PIL thus performs two roles in the device 77 of this example: it serves as the PCM for the PEM and as a drying agent to capture ambient water-group species 99. An exemplary thickness of the ionic liquid 27 on top of the semipermeable layer 28 ranges from 0.001 to 0.04 inches (25 microns to 1 mm).

Alternatively, an aprotic ionic liquid can serve as the drying agent and the PIL can serve as the PCM for the PEM. Alternatively, water can serve as the PCM for the PEM and a protic or aprotic ionic liquid can serve as the drying agent. But an advantage of using the PIL as the PCM for the PEM is that the top layer 23 of the device 77 can be thoroughly dried by electrolysis without depleting the PEM of its PCM. Thorough drying is advantageous for science experiments so as to remove terrestrial water as a contaminant.

Alternatively, a sulfonated polyimide can be employed as the PEM and the PIL diethylmethylammonium trifluoromethanesulfonate can be employed as the PCM. See Yasuda et al., "Protic ionic liquids: Fuel cell applications," MRS Bulletin, Vol. 38, No. 7, 2013, pp. 560-566.

Referring to FIG. 6, in operation when a predetermined electric potential difference 32 is applied between the topside and underside electrode contacts 30, 31, hydrogen gas ($H_2$) is evolved 33 at the underside electrode contact 31 and oxygen gas ($O_2$) is evolved 34 at the topside electrode contact 30 by electrolysis of water ($H_2O$) supplied 35 by impingement of ambient water-group species 99. Referring to FIG. 6 in view of FIGS. 1, 2, 3, and 4, the evolved hydrogen gas 33 is stored in the internal void 22 of the device 77.

According to the device 77 of this example, the predetermined electric potential difference 32 to be applied is estimated as 1.23-3 V, with a polarity as shown in FIG. 6.

Example 2

Figure 7:
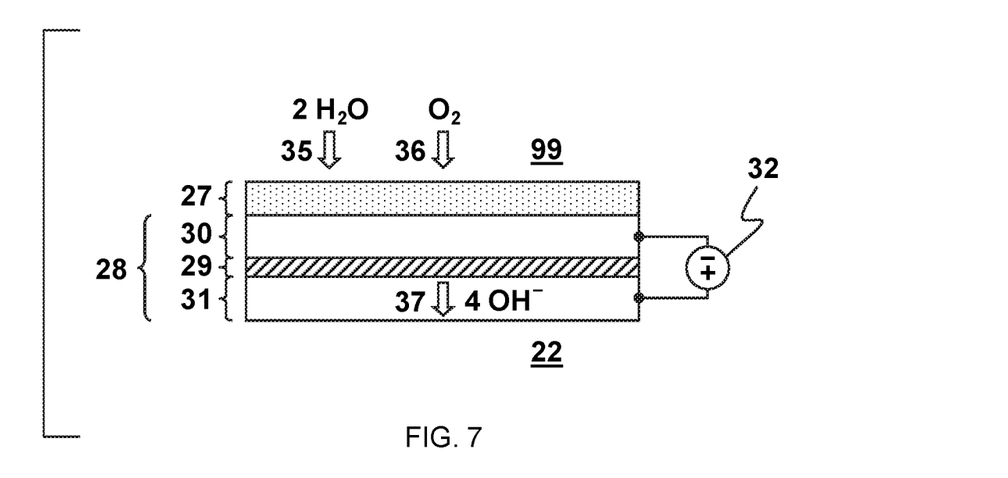
FIGS. 7, 8, and 9 show the section of device shown in FIG. 4, wherein the semipermeable membrane 29 comprises a hydroxide exchange membrane.
Figure 8:
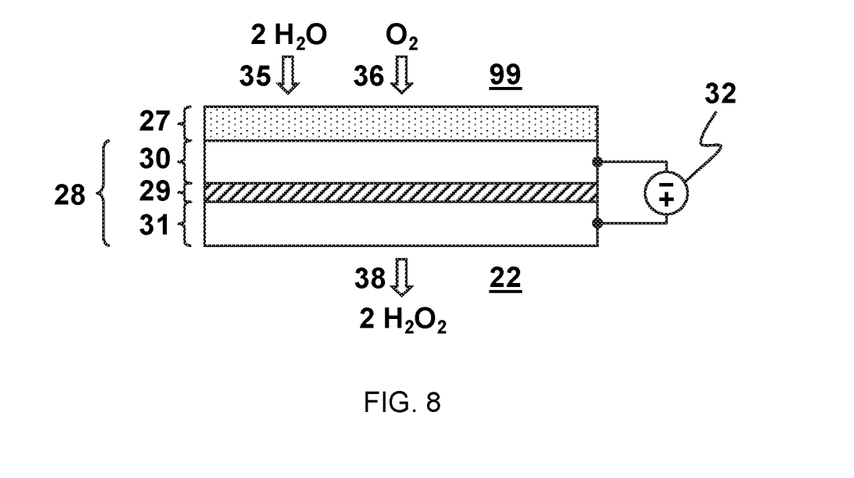
Figure 9:
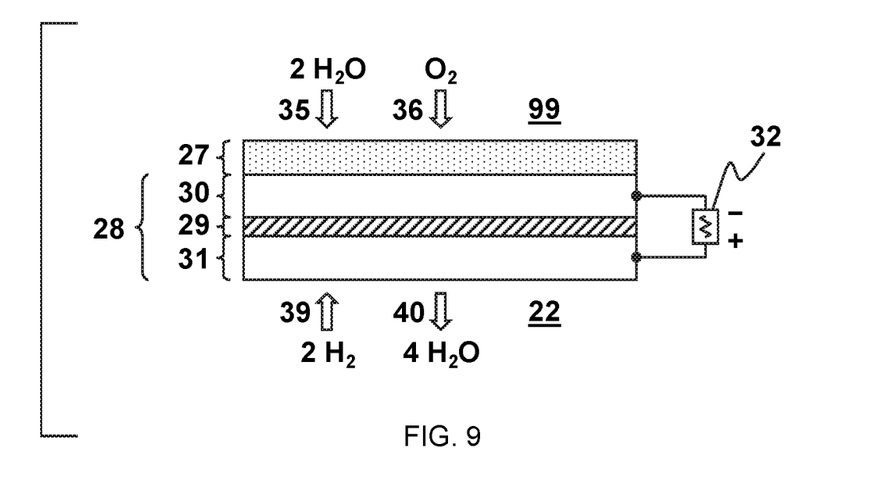

Referring to FIGS. 7, 8, and 9 in view of FIGS. 1, 2, 3, and 4, according to the device 77 of this example, the semipermeable membrane 29 comprises a hydroxide exchange membrane; and, the hydroxide exchange membrane comprises poly (aryl piperidinium). According to a non-limiting theory of the invention, the device 77 of this example is configured to urge captured water-group species 99 to pass through the semipermeable membrane 29 on the basis of the well-known principles of an alkaline anion exchange membrane fuel cell, more specifically a hydroxide exchange membrane fuel cell. Fuel cell designs employing a hydroxide exchange membrane comprising poly (aryl piperidinium) have been disclosed by Yan et al. in US 2019/0036143 A1 and by Wang et al. See Wang et al., "Poly (aryl piperidinium) membranes and ionomers for hydroxide exchange membrane fuel cells," Nature Energy, Vol. 4, 2019, pp. 392-398.

As shown in FIG. 7, upon application of the predetermined electric potential difference 32 with the polarity shown, water ($H_2O$) and oxygen ($O_2$) supplied 35, 36 by impingement of ambient water-group species 99 is passed through the semipermeable membrane 29 as hydroxide ion ($OH^-$) 37. As will be appreciated by one skilled in the art of electrochemistry, the hydroxide ion finds utility in a variety of chemical reactions. Exemplary chemical reactions are shown in FIGS. 8 and 9. Though not shown in FIGS. 1 and 2, the device 77 can be provided with a plurality of connection valves so that chemical reactants and products can be circulated within the internal void 22.

As shown in FIG. 8, upon application of the predetermined electric potential difference 32 with the polarity shown, water ($H_2O$) and oxygen ($O_2$) supplied 35, 36 by impingement of ambient water-group species 99 is passed through the semipermeable membrane 29 and into the internal void 22 as hydrogen peroxide ($H_2O_2$) 38. Hydrogen peroxide finds exemplary uses as a monopropellant and oxidant.

As shown in FIG. 9, when water ($H_2O$) and oxygen ($O_2$) are supplied 35, 36 by impingement of ambient water-group species 99, and hydrogen fuel ($H_2$) is supplied 39 via the internal void 22, then the device 77 internally generates the applied predetermined electric potential difference 32 as electrical power having the polarity shown, and a net electrochemical reaction is for water ($H_2O$) to be passed 40 into the internal void 22. To supply the hydrogen fuel 39, a connection can be made via the connection valve 25 to a second device 77 which produces hydrogen according to Example 1; in this arrangement, electrical power generated by the device 77 according to Example 2 can be used to offset some of the electrical power required for operation of the device 77 according to Example 1; however, as to ISRU efficiency, noted is that the Example 1 device 77 neglects a portion of the oxygen it captures, in contrast to the device 77 of Example 4, as described below.

For operation, an electrical circuit formed between the electrical contacts 21 must be closed in order for the device 77 to generate the applied predetermined electric potential difference 32 internally. In some cases, internal voltage losses (i.e., overpotential) may depreciate any electric potential difference generated internally from the supplied hydrogen fuel 39 and to such an extent that an external supplement of electric power must be applied via the electrical contacts 21 to produce the predetermined electric potential difference 32 needed for operation.

Example 3

Figure 10:
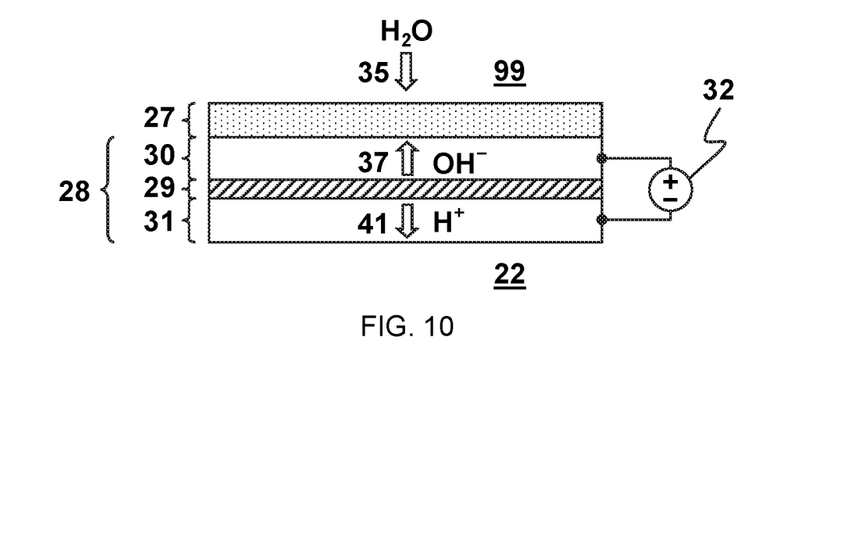
FIG. 10 shows the section of device shown in FIG. 4, wherein the semipermeable membrane 29 comprises a bipolar membrane.

Referring to FIG. 10 in view of FIGS. 1, 2, 3, and 4, according to the device 77 of this example, the semipermeable membrane 29 comprises a biopolar membrane. According to a non-limiting theory of the invention, the device 77 of this example is configured to urge captured water-group species 99 to pass through the semipermeable membrane 29 on the basis of the well-known principles of a bipolar membrane electrolyzer.

As shown in FIG. 10, upon application of the predetermined electric potential difference 32, water ($H_2O$) supplied 35 by impingement of ambient water-group species 99 is urged by electroosmosis into the semipermeable membrane 29, where it is electrolyzed into hydroxide ion ($OH^-$) 37 at the topside electrode contact 30 and hydrogen ion ($H^+$) 41 at the underside electrode contact 31. One skilled in the art of electrochemistry will appreciate that the hydrogen and hydroxide ions can participate in a plurality of chemical reactions and can also serve to moderate pH or maintain a pH gradient.

For example, according to the art of electrochemistry, carbon dioxide exhaled by astronauts can be supplied to the internal void 22 of the device 77 via the connection valve 25 to produce valuable chemicals with the aid of the hydrogen ion 41 produced by operation of the device 77. As Ramdin et al. disclose (p. 1834, column 1): "$CO_2$ can be converted in an electrochemical cell to various value-added products such as acids, alcohols, hydrocarbons, and syngas. The selectivity of the different products depends on many process variables such as the type of catalyst and its morphology, temperature, pressure, potential and current density, pH, electrolyte type and concentration, aqueous or nonaqueous solvent, flow characteristics, impurities, membranes, cell design, etc." Internal citations omitted. See Ramdin et al., "High pressure electrochemical reduction of $CO_2$ to formic acid/formate: A comparison between bipolar membranes and cation exchange membranes," Industrial & Engineering Chemistry Research, Vol. 58, No. 5, 2019, pp. 1834-1847.

Example 4

Figure 11:
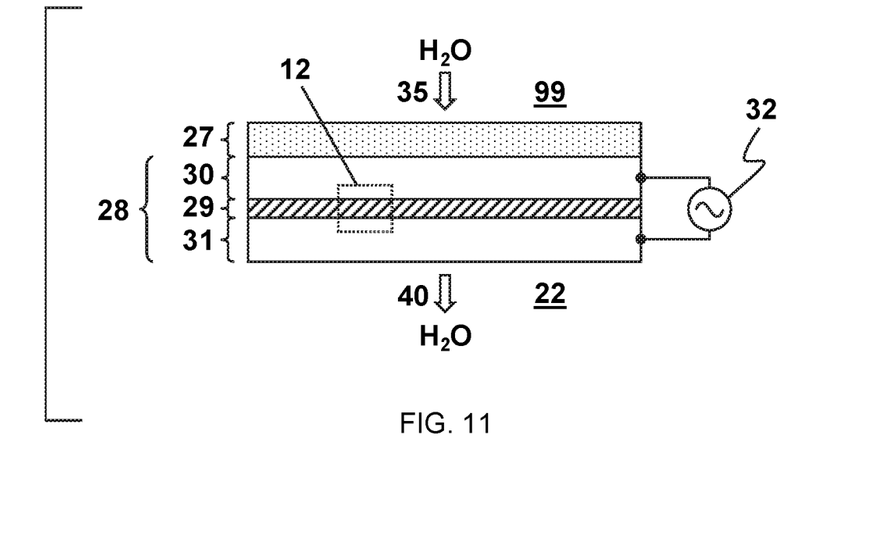
FIG. 11 shows the section of device shown in FIG. 4, wherein the semipermeable membrane 29 comprises a composite semipermeable membrane.
Figure 12:
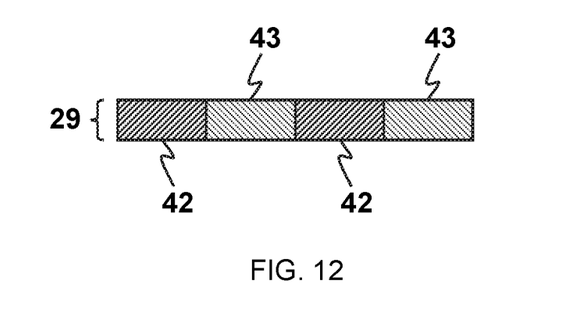
FIG. 12 is a close-up view of a section of the semipermeable membrane 29 shown in FIG. 11 comprising the composite semipermeable membrane.

Referring to FIGS. 11 and 12 in view of FIGS. 1, 2, 3, 4, 6, and 9, according to the device 77 of this example, the semipermeable membrane 29 comprises a composite semipermeable membrane having a proton exchange region and a hydroxide exchange region and the applied predetermined electric potential difference 32 alternates in polarity. According to a non-limiting theory of the invention, the device 77 of this example is configured to urge captured water-group species 99 to pass through the semipermeable membrane 29 on the combined basis of the well-known principles of a proton exchange membrane electrolyzer and the well-known principles of a hydroxide exchange membrane fuel cell.

As shown in FIG. 11, upon application of the predetermined electric potential difference 32, which in this example is an alternating electric potential difference, in operation a net electrochemical effect of the device 77 of this example is to urge water ($H_2O$) 35 supplied by impingement of ambient water-group species 99 to pass through the semipermeable membrane 29 and into the internal void 22 as passed water ($H_2O$) 40.

FIG. 12 shows a close-up view of the semipermeable membrane 29 comprising the composite semipermeable membrane according to the device 77 of this example. As shown in FIG. 12, the composite semipermeable membrane comprises proton exchange regions 42 and hydroxide exchange regions 43. According to this example, the proton exchange regions 42 comprise a 0.005 inch (127 micron) thick perfluorinated proton exchange membrane (Nafion® 115; Chemours, Wilmington, DE) and the hydroxide exchange regions 43 comprise a 0.005 inch (127 micron) thick poly (aryl piperidinium) membrane. According to the device 77 of this example, the topside and underside electrode contacts 30, 31 according to Example 1 are hot pressed to the semipermeable membrane 29 comprising the composite semipermeable membrane.

According to the device 77 of this example, the semipermeable membrane 29 having a hexagonal pattern of the proton exchange and hydroxide exchange regions 42, 43 is prepared by solution-casting respective polymer dispersions in dimethyl sulfoxide (DMSO) solvent according to the art in a corresponding hexagonal droplet pattern on a clean glass plate. See Silva et al., "Solution-cast Nafion® ionomer membranes: Preparation and characterization," Electrochimica Acta, Vol. 49, No. 19, 2004, pp. 3211-3219; Wang et al., "Poly (aryl piperidinium) membranes and ionomers for hydroxide exchange membrane fuel cells," Nature Energy, Vol. 4, 20 [2] 19, pp. 392-398. Alternatively, strips or pieces of each of the two exchange membrane kinds can be bonded together to form a quilt.

The operation of the device 77 according to this example will be further appreciated in view FIGS. 6 and 9, so as to break down the net electrochemical effect of the operation shown in FIG. 12 into a "hydrogen stroke" (FIG. 6) and a "water stroke" (FIG. 9). Referring to FIG. 6, according to the hydrogen stroke the device 77 operates in "electrolyzer mode" and functions analogously to the device 77 of Example 1. Referring to FIG. 9 in view of FIG. 6, using as hydrogen fuel 39 the hydrogen evolved 33 at the underside electrode contact 31 during the hydrogen stroke, according to the water stroke the device 77 operates in "fuel cell mode" and functions analogously to the device 77 of Example 2.

However, according the operation of the device 77 of this example, it is preferable for the two strokes to cycle back and forth with a predetermined frequency of alternation which is high enough to at least preclude loss of evolved oxygen 34 into space. It is even more preferable for the hydrogen and oxygen evolved 33, 34 in the hydrogen stroke (FIG. 6) not to leave the semipermeable layer 28 before being consumed by the water stroke (FIG. 9). It is most preferable for the two cycles to reciprocate with such a frequency as to preclude substantial formation of hydrogen and oxygen gas within the device 77, in favor of consuming during the water stroke gas precursors which were generated during the hydrogen stroke.

According to a non-limiting thermodynamic theory of the device 77 according to this example, an amount of electrical energy expended by external application of the predetermined electric potential difference 32 during the hydrogen stroke can be recovered as an amount of electrical energy generated by internal application of the predetermined electric potential difference 32 during the water stroke, minus voltage losses associated with both strokes. In other words, because the hydrogen and water strokes are essentially thermodynamic reciprocals of each other, then aside from voltage losses, the net energy required to pass water from the ionic liquid 27 to the internal void 22 is zero. The voltage losses reflect the work of moving water across the semipermeable layer 28 from the ionic liquid 27 and into the internal void 22. Accordingly, based on thermodynamic efficiency and conservation of captured water-group species 99, the device 77 according to this example is regarded as the best mode of practicing the invention.

Electrical energy generated by the water stroke can be recovered and stored according to a preconfigured electrical circuit. The stored electrical energy can be employed to satisfy a portion of the electrical energy required for a subsequent hydrogen stroke. However, referring to FIG. 11 in view of FIGS. 6 and 9, the overall cycle (FIG. 11) begins with the hydrogen stroke (FIG. 6) to produce hydrogen 33, given that the water stroke (FIG. 9) will not operate in absence of hydrogen fuel 39.

Alternatively, rather than storing the electrical energy recovered in the water stroke for use in a subsequent hydrogen stroke of the same device 77, two devices 77 according to this example can be connected together via their respective electrical contacts 21 by a preconfigured electrical circuit to operate the devices 77 out of phase, such that electrical energy generated by the water stroke of one device 77 provides a portion of the electrical energy required for the hydrogen stroke of the other device 77.

In absence of electrical circuitry to recover energy generated in the fuel cell stage, first the predetermined electric potential difference 32 is applied to the electrical contacts 21 by an external power supply to perform the hydrogen stroke, as shown in FIG. 6; next, to perform the water stroke, the external power supply is shut off while maintaining a closed electrical circuit between the electrical contacts 21 to allow the device 77 to apply the predetermined potential difference 32 internally based on its consumption of hydrogen fuel 39, as shown in FIG. 9. However, if an electric potential difference generated during the water stroke is less than the predetermined value required for operation of the device 77, for example, due to voltage losses or a paucity of hydrogen fuel 39, then any remaining amount of electric potential difference required for operation can be supplied via the external power supply.

Example 5

Figure 13:
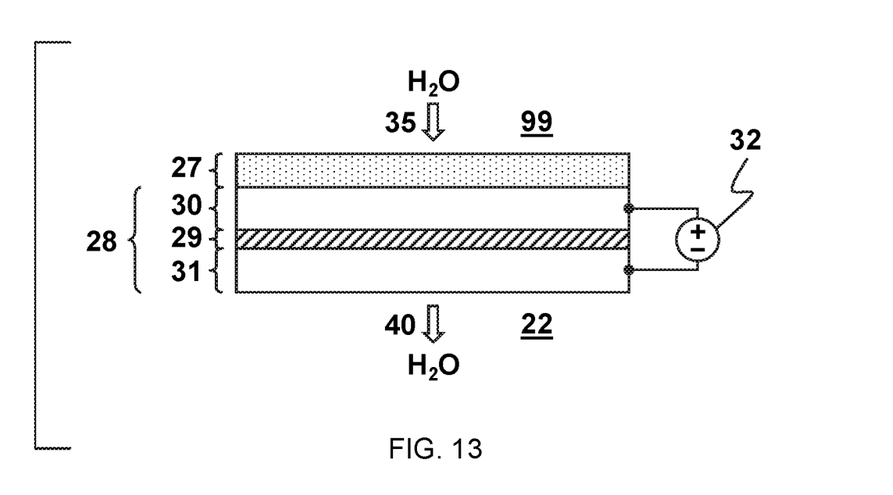
FIG. 13 shows the section of device shown in FIG. 4, wherein the semipermeable membrane 29 comprises a water-permeable membrane.

Referring to FIG. 13 in view of FIGS. 1, 2, 3, and 4, according to the device 77 of this example, the semipermeable membrane 29 comprises a water-permeable membrane comprising electrospun fibers, polyamide, cellulose, regenerated cellulose, cellulose ester, polysulfone, polyethersulfone, etched polycarbonate, or collagen; and, the topside and underside electrode contacts 30, 31 comprise an ion-electron transducer or, to specify an exemplary ion-electron transducer material, poly(3,4-ethylenedioxythiophene) (PEDOT) blended with poly(styrenesulfonate) (PEDOT:PSS). According to a non-limiting theory of the invention, the device 77 of this example is configured to urge captured water-group species 99 to pass through the semipermeable membrane 29 on the basis of the well-known principles of electroosmosis.

Referring to FIG. 13, according to the device 77 of this example, the semipermeable membrane 29 is specifically a 0.005 inch (127 micron) thick polyamide water-permeable membrane and the topside and underside electrode contacts 30, 31 comprise the ion-electron transducer material PEDOT: PSS. According to this example, the PEDOT: PSS is printed in a honeycomb pattern on both sides of the polyamide membrane using inkjet printing. See Erlandsson et al., "Electrolysis-reducing electrodes for electrokinetic devices," Electrophoresis, Vol. 32, No. 6-7, 2011, pp. 784-790. The topside electrode contact 30 is covered with a thin film of the ionic liquid 27. In operation, the predetermined electric potential difference 32 is applied by an external power supply via the electrical contacts 21 with the polarity shown in FIG. 13, so as to urge water supplied 35 by impingement of ambient water-group species 99 to pass through the semipermeable layer 28 and into the internal void 22 as passed water ($H_2O$) 40. Exemplary values for the predetermined electric potential difference 32 range up to 100 V or more according to this example.

3. Accessories

The inventive device 77 can be configured as a scientific instrument for monitoring a flux of ambient water-group species 99 impinging on the ionic liquid 27. Such an instrument has meteorological value in gathering data on temporal and spatial changes in said flux. It also has value in providing indicia for controlling operation of the device 77 programmatically.

According to the invention, the flux is monitored by two distinct methods. According to a first method, which is applicable to the devices 77 of all of the above-stated examples, the method comprises a step of sensing changes in an electrical resistivity of the ionic liquid 27, whereby electrical resistivity measurements are obtained to indicate an amount of water-group species present within the ionic liquid 27. According to a second method, which is applicable to the devices 77 of Examples 1, 2, 3, and 4, the method comprises a step of sensing an amount of electric current expended in applying the predetermined electric potential difference 32 over time, whereby electric charge measurements are obtained as a product of time and electric current to indicate an amount of water-group species passing through the semipermeable membrane 29.

The second method of monitoring flux is not applicable to Example 5 inasmuch as the water-permeable membrane allows electrons to pass through the semipermeable layer 28. In contrast, as will be appreciated by one skilled in the art of electrochemistry, inasmuch as the semipermeable membranes 29 of the devices 77 according to Examples 1, 2, 3, and 4 do not allow electrons to pass therethrough, the amount of electric charge passing through the semipermeable membrane 29 will in such a case be limited to a measure of a number of ions passing through.

In either case, preconfigured electrical circuits can be employed according to the art to sense and quantify changes in the electrical resistivity of the ionic liquid 27 or to sense an amount of electric current expended over time. In addition to detecting changes in the electrical resistivity of the ionic liquid 27, or conversely its electrical conductivity, laboratory calibration of particular devices 77 can enable a correlation of such measurements with an absolute amount of water-group species present in the ionic liquid 27. One skilled in the art will appreciate that the electrical conductivity of an ionic liquid changes substantially with changes in water content, including changes in trace water content. See Vila et al., "Great increase of the electrical conductivity of ionic liquids in aqueous solutions," Fluid Phase Equilibria, Vol. 247, No. 1-2, 2006, pp. 32-39.

Referring to FIGS. 1, 2, 3, 4, and 5, miscellaneous accessories include: to sense a temperature and pressure within the internal void 22, temperature and pressure sensors; to absorb shock from meteoroid impact, the topside electrode contact 30 comprising shock-absorbent materials or the ionic liquid 27 having a predetermined viscosity; to facilitate a rolling and unrolling of the device 77, a hollow tube disposed at an end of the unrolled device 77 and forming a central core of the rolled device 77; for autonomous unrolling, a rover or tool having a roller passing through the core of the rolled device 77 for ease of winding and unwinding; for autonomous unrolling, inflatable ribs disposed on the bottom layer 24 in gaseous communication with a charge of gas for unrolling the device 77; for autonomous unrolling, elastic members disposed on the bottom layer 24 for unrolling the device 77 upon release of a closure configured to hold the device 77 in the rolled state; and, to provide electrical, sensory, and gaseous communication between the device 77 and a spacecraft, lander, rover, or other device, a connecting umbilical cord attached to the device 77.

As to autonomous unrolling, noted is that upon reviewing the invention disclosed in U.S. provisional application Ser. No. 62/796,699, an anonymous NASA panel made the following suggestion, and which suggestion is not claimed as the invention: "For methods of deploying large rolls, you may want to consider shape memory alloys. Ribs of SMAs would unroll using a small electrical current."

Though FIG. 6 shows the evolved oxygen gas component 34 being vented back into space, in practice the oxygen can be reclaimed by scraping the ionic liquid 27 off of the device 77 and extracting the oxygen according to the art. The device 77 can then be primed with a fresh layer of the ionic liquid 27 and placed back into service. The scraping and priming operations can be aided by a roller mechanism which rolls the device 77 up as it passes under a scraper first and then under an applicator for the ionic liquid 27.

Referring to an exemplary FIG. 6, to prevent loss back into space, the ionic liquid 27 can be disposed with getters or binders to aid in the retention of chemicals such as oxygen.

Contents of the internal void 22 of the device 77 can be subject to further compression, condensation, or chemical combination according to the art, including with storage in an external vessel. For example, according to the device 77 of Example 1, an electrochemical hydrogen compressor can be connected to the connection valve 25 to compress evolved hydrogen 33 from the internal void 22 into the external vessel for storage; pressure and temperature readings from the internal void 22 and external vessel can serve as indicia for when to turn the hydrogen compressor on and off.

Referring to the device 77 of FIG. 4, by analogy to an electrochemical hydrogen compressor a plurality of semipermeable layers 28 can be disposed in series for high pressure operation, including with housings and fittings to sustain high pressure operation.

For deployment on a spacecraft traveling in space, the device 77 can be supported by a panel array facing a direction of maximum impingement of the ambient water-group species 99. Although in most cases the direction of maximum impingement is contemplated to be the direction of travel, the panel array can be pointed in the direction of maximum impingement with the aid of indicia from flux measurements according to the invention.

As an alternative to rolling, the device 77 can be folded like an accordion, in which case a removable hydrophobic sheet can be placed over the ionic liquid 27 as a separator prior to folding and then removed after unfolding.

Additional electrodes can be installed within the device 77 and operated according to the art of electrochemistry. The device 77 can be disposed with catalysts, reagents, and other additives to improve operation according to the art of electrochemistry.

The device 77 can use its own waste heat to warm itself, for example, during nighttime operation; it can also be employed like a blanket to warm other devices.

4. Additional Disclosure

In this disclosure, the term semipermeable membrane includes not only the plain and ordinary meaning of a semipermeable membrane, but can also include any selective barrier suitable for forming a semipermeable layer, including but not limited to membranes, films, sheets, composite membranes, nanocomposite membranes, ionomers, polyelectrolytes, polysalts, ionenes, gels, viscous electrolytes, viscous electrolyte suspensions, salt bridges, porous materials, clays, filters, and microchannel arrays.

The drawing of FIGS. 6, 7, 8, 9, 10, 11, and 13 employs stoichiometric quantities of chemical species to illustrate exemplary electrochemical reactions. However, where water is shown being supplied as $H_2O$ 35 by impinging ambient water-group species 99, it is an $H_2O$ equivalent that is being signified, such that a plurality of individual species, including but not limited to OH and H, can be supplied to achieve the indicated $H_2O$ equivalent overall. Similarly, where FIGS. 7, 8, and 9 show molecular oxygen ($O_2$) being supplied 36 by impinging ambient water-group species 99, it is an $O_2$ equivalent that is being signified, such that a plurality of individual species, including but not limited to atomic oxygen (O), can be supplied to achieve the indicated $O_2$ equivalent overall.

It has been suggested that the photodissociation or radical pairs of water can "heal" upon lunar surface contact to form $H_2O$. Califormiaa, "Influence of the lunar ambience on dynamic surface hydration on sunlit regions of the Moon," Advances in Space Research, Vol. 55, No. 6, 2015, pp. 1705-1709. In general, it is contemplated that ambient species captured by the ionic liquid 27 can form a plurality of species by chemical combination. Catalysts and substrates can be added to the top layer 23 of the device 77 to promote such combination.

Regarding the device 77 according to Examples 1, 2, 3, and 4, it is contemplated that the predetermined electric potential difference 32 required for device operation will generally be no greater than 12 V, with the polarity shown. However, inefficiency due to large overpotentials can cause the required electric potential difference to be greater.

To minimize overpotential, thin layers of the ionic liquid 27 are preferred over thick layers, as measured from a top face of the topside electrode contact 30. Exemplary thin layers range in thickness from 10 microns to 3 mm (0.4 mil to 0.125 inches). Where electric power will not be available for long interim periods, larger volumes of the ionic liquid 27 per unit area of the active area 26 can be employed to maintain lower concentrations of captured water-group species 99 within the ionic liquid 27 to reduce escape back into space; in such cases, the topside electrode contact 30 can have an increased thickness to hold a greater amount of the ionic liquid 27 within interstitial spaces provided for electrolyte diffusion, rather than increasing a thickness of the ionic liquid 27 above the topside electrode contact 30.

Regarding the device 77 according to Examples 1, 2, 3, and 4, exemplary electrode contacts contain a carbon supported catalyst and electrically conductive fibers forming an electrode which doubles as a diffusion layer for electrolytes or gases. An exemplary carbon material to support the catalyst takes the form of carbon paper, fleece, or cloth, for example, an ELAT® carbon cloth (Nuvant Systems, Crown Point, IN). When impregnated with an electrically conductive catalyst, the carbon material itself can also serve as the electrode. Exemplary catalysts include IrRuOx for the topside electrode contact 30 and PtB for the underside electrode contact 31. An exemplary method of applying the electrode contacts 30, 31 to respective sides of the semipermeable membrane 29 is hot pressing.

The device 77 according to FIG. 1 can be deployed on any surface of the Moon 88. The devices 77 of Examples 1, 2, 3, 4, and 5 are particularly suited to sunlit non-polar regions. A maximum amount of water-group species 99 impinging per unit time has been predicted near a latitude of 58° in the Northern and Southern Hemispheres of the Moon, though substantial impingement is expected on any sunlit region. See Califormiaa, "Influence of the lunar ambience on dynamic surface hydration on sunlit regions of the Moon," Advances in Space Research, Vol. 55, No. 6, 2015, pp. 1705-1709.

The device 77 according to FIG. 1 can be similarly deployed on any surface of the planet Mercury.

What is claimed is:

1. A device for a membrane-based processing of ambient water-group species captured from an outside environment within a region of outer space not within a homosphere, comprising:
   a semipermeable membrane;
   topside and underside electrode contacts disposed on respective topside and underside faces of the semipermeable membrane; and,
   an ionic liquid disposed on the topside face of the semipermeable membrane on top of and in contact with the topside electrode contact as a drying agent to capture ambient water-group species from an outside environment within a region of outer space not within a homosphere, the ionic liquid being open to the outside environment;
   wherein the electrode contacts are adapted to apply an electric potential difference across the semipermeable membrane when connected to an electrical power supply or when forming a closed electrical circuit, whereby upon applying the electric potential difference across the semipermeable membrane at least some of the water-group species captured by the ionic liquid from the outside environment are urged to pass through the semipermeable membrane; and,
   wherein the ionic liquid has non-volatility to not evaporate into the outside environment, hygroscopy to capture the water-group species from the outside environment, and ionic conductivity to provide an electrically conductive medium in which the water-group species are mobile.

2. The device of claim 1, wherein the semipermeable membrane is selected from the group consisting of a proton exchange membrane, hydroxide exchange membrane, semipermeable membrane configured for proton exchange and hydroxide exchange, bipolar membrane, and water-permeable membrane.

3. The device of claim 2, further including a reservoir for storing the water-group species passed through the semipermeable membrane, the reservoir being disposed on the underside face of the semipermeable membrane.

4. The device of claim 3, being configured for stowage in a manner of rolled plastic sheeting, whereby the device is deployed by unrolling.

5. A device for a membrane-based processing of ambient water-group species captured from an outside environment within a region of outer space not within a homosphere, comprising:
   a proton exchange membrane;
   topside and underside electrode contacts disposed on respective topside and underside faces of the proton exchange membrane; and,
   an ionic liquid disposed on the topside face of the proton exchange membrane on top of and in contact with the topside electrode contact as a drying agent to capture ambient water-group species from an outside environment within a region of outer space not within a homosphere, the ionic liquid being open to the outside environment;
   wherein the electrode contacts are adapted to apply an electric potential difference across the proton exchange membrane when connected to an electrical power supply or when forming a closed electrical circuit, whereby upon applying the electric potential difference across the proton exchange membrane at least some of the water-group species captured by the ionic liquid from the outside environment are urged to pass through the proton exchange membrane; and,
   wherein the ionic liquid has non-volatility to not evaporate into the outside environment, hygroscopy to capture the water-group species from the outside environment, and ionic conductivity to provide an electrically conductive medium in which the water-group species are mobile.

6. The device of claim 5, wherein the proton exchange membrane comprises a perfluorinated ion-exchange membrane.

7. The device of claim 6, wherein the proton exchange membrane has disposed therein a proton conducting medium comprising a protic ionic liquid.

8. The device of claim 7, wherein at least one of the electrode contacts comprises a carbon-based diffusion layer loaded with an electrically conductive catalyst.

9. A device for a membrane-based processing of ambient water-group species captured from an outside environment within a region of outer space not within a homosphere, comprising:
   a hydroxide exchange membrane;
   topside and underside electrode contacts disposed on respective topside and underside faces of the hydroxide exchange membrane; and,
   an ionic liquid disposed on the topside face of the hydroxide exchange membrane on top of and in contact with the topside electrode contact as a drying agent to capture ambient water-group species from an outside environment within a region of outer space not within a homosphere, the ionic liquid being open to the outside environment;

wherein the electrode contacts are adapted to apply an electric potential difference across the hydroxide exchange membrane when connected to an electrical power supply or when forming a closed electrical circuit, whereby upon applying the electric potential difference across the hydroxide exchange membrane at least some of the water-group species captured by the ionic liquid from the outside environment are urged to pass through the hydroxide exchange membrane; and, wherein the ionic liquid has non-volatility to not evaporate into the outside environment, hygroscopy to capture the water-group species from the outside environment, and ionic conductivity to provide an electrically conductive medium in which the water-group species are mobile.

10. The device of claim 9, wherein the hydroxide exchange membrane comprises poly (aryl piperidinium).

11. A device for a membrane-based processing of ambient water-group species captured from an outside environment within a region of outer space not within a homosphere, comprising:

a bipolar membrane;

topside and underside electrode contacts disposed on respective topside and underside faces of the bipolar membrane; and, an ionic liquid disposed on the topside face of the bipolar membrane on top of and in contact with the topside electrode contact as a drying agent to capture ambient water-group species from an outside environment within a region of outer space not within a homosphere, the ionic liquid being open to the outside environment;

wherein the electrode contacts are adapted to apply an electric potential difference across the bipolar membrane when connected to an electrical power supply or when forming a closed electrical circuit, whereby upon applying the electric potential difference across the bipolar membrane at least some of the water-group species captured by the ionic liquid from the outside environment are urged to pass through the bipolar membrane; and, wherein the ionic liquid has non-volatility to not evaporate into the outside environment, hygroscopy to capture the water-group species from the outside environment, and ionic conductivity to provide an electrically conductive medium in which the water-group species are mobile.

12. A device for a membrane-based processing of ambient water-group species captured from an outside environment within a region of outer space not within a homosphere, comprising:

a semipermeable membrane configured for proton exchange and hydroxide exchange;

topside and underside electrode contacts disposed on respective topside and underside faces of the semipermeable membrane; and, an ionic liquid disposed on the topside face of the semipermeable membrane on top of and in contact with the topside electrode contact as a drying agent to capture ambient water-group species from an outside environment within a region of outer space not within a homosphere, the ionic liquid being open to the outside environment;

wherein the electrode contacts are adapted to apply an electric potential difference across the semipermeable membrane when connected to an electrical power supply or when forming a closed electrical circuit, whereby upon applying the electric potential difference across the semipermeable membrane at least some of the water-group species captured by the ionic liquid from the outside environment are urged to pass through the semipermeable membrane; and, wherein the ionic liquid has non-volatility to not evaporate into the outside environment, hygroscopy to capture the water-group species from the outside environment, and ionic conductivity to provide an electrically conductive medium in which the water-group species are mobile.

13. The device of claim 12, wherein the electric potential difference alternates in polarity.

14. The device of claim 13, wherein at least one of the electrode contacts comprises a carbon-based diffusion layer loaded with an electrically conductive catalyst.

15. A device for a membrane-based processing of ambient water-group species captured from an outside environment within a region of outer space not within a homosphere, comprising:

a water-permeable semipermeable membrane;

topside and underside electrode contacts disposed on respective topside and underside faces of the water-permeable semipermeable membrane; and, an ionic liquid disposed on the topside face of the water-permeable semipermeable membrane on top of and in contact with the topside electrode contact as a drying agent to capture ambient water-group species from an outside environment within a region of outer space not within a homosphere, the ionic liquid being open to the outside environment;

wherein the electrode contacts are adapted to apply an electric potential difference across the water-permeable semipermeable membrane when connected to an electrical power supply or when forming a closed electrical circuit, whereby upon applying the electric potential difference across the water-permeable semipermeable membrane at least some of the water-group species captured by the ionic liquid from the outside environment are urged to pass through the water-permeable semipermeable membrane; and, wherein the ionic liquid has non-volatility to not evaporate into the outside environment, hygroscopy to capture the water-group species from the outside environment, and ionic conductivity to provide an electrically conductive medium in which the water-group species are mobile.

16. The device of claim 15, wherein the water-permeable semipermeable membrane comprises electrospun fibers, polyamide, cellulose, regenerated cellulose, cellulose ester, polysulfone, polyethersulfone, etched polycarbonate, or collagen.

17. The device of claim 16, wherein at least one of the electrode contacts comprises an ion-electron transducer.

18. The device of claim 17, wherein the ion-electron transducer comprises poly (3,4-ethylenedioxythiophene) blended with poly (styrenesulfonate).

19. A device for a membrane-based processing of water-group species captured from an outside environment, comprising:

a semipermeable membrane;

topside and underside electrode contacts disposed on respective topside and underside faces of the semipermeable membrane; and, an ionic liquid disposed on the topside face of the semipermeable membrane on top of and in contact with the topside electrode contact as a drying agent to capture water-group species from an outside environment;

wherein the electrode contacts are adapted to apply an electric potential difference across the semipermeable membrane when connected to an electrical power supply or when forming a closed electrical circuit, whereby upon applying the electric potential difference across the semipermeable membrane at least some of the water-group species captured by the ionic liquid from the outside environment are urged to pass through the semipermeable membrane; and, wherein the ionic liquid has non-volatility to not evaporate into the outside environment, hygroscopy to capture the water-group species from the outside environment, and ionic conductivity to provide an electrically conductive medium in which the water-group species are mobile.

20. The device of claim 19, wherein the semipermeable membrane is selected from the group consisting of a proton exchange membrane, hydroxide exchange membrane, semipermeable membrane configured for proton exchange and hydroxide exchange, bipolar membrane, and water-permeable membrane.

21. The device of claim 20, further including a reservoir for storing the water-group species passed through the semipermeable membrane, the reservoir being disposed on the underside face of the semipermeable membrane.

22. The device of claim 19, wherein the semipermeable membrane is configured for proton exchange and hydroxyl exchange.

23. The device of claim 22, wherein the electric potential difference alternates in polarity.

24. The device of claim 23, wherein at least one of the electrode contacts comprises a carbon-based diffusion layer loaded with an electrically conductive catalyst.

25. A device for a membrane-based processing of ambient water-group species captured from an environment within a region of outer space not within a homosphere, comprising:
a device body; and,
an outer space environment located within a region of outer space not within a homosphere;
the device body, further comprising:
a semipermeable membrane having a topside face and an underside face;
a topside electrode contact disposed on the topside face of the semipermeable membrane;
an underside electrode contact disposed on the underside face of the semipermeable membrane;
an ionic liquid disposed as an outermost layer on the topside electrode contact, wherein the ionic liquid acts as a drying agent to capture ambient water-group species from the outer space environment outside the device body;
a configuration of the ionic liquid layer, wherein an outermost face of the ionic liquid layer is open to the outer space environment outside the device body, whereby the ionic liquid layer is directly exposed to impingement from an incident flux of the ambient water-group species present in the outer space environment;
wherein the electrode contacts are adapted to apply an electric potential difference across the semipermeable membrane when connected to an electrical power supply or when forming a closed electrical circuit, whereby upon applying the electric potential difference across the semipermeable membrane at least some of the water-group species captured by the ionic liquid from the outer space environment are urged to pass through the semipermeable membrane; and,
wherein the ionic liquid has non-volatility to not evaporate into the outer space environment, hygroscopy to capture the water-group species from the outer space environment, and ionic conductivity to provide an electrically conductive medium in which the water-group species are mobile.

26. The device of claim 25, wherein the semipermeable membrane is selected from the group consisting of a proton exchange membrane, hydroxide exchange membrane, semipermeable membrane configured for proton exchange and hydroxide exchange, bipolar membrane, and water-permeable membrane.

27. The device of claim 25, wherein the device body is supported by a panel array.

28. The device of claim 26, wherein the device body is supported by a panel array.

29. The device of claim 26, further including a reservoir for storing the water-group species passed through the semipermeable membrane, the reservoir being disposed on the underside face of the semipermeable membrane.

30. The device of claim 29, being configured for stowage in a manner of rolled plastic sheeting, whereby the device is deployed by unrolling.

* * * * *